US006987665B2

(12) United States Patent  (10) Patent No.: US 6,987,665 B2
Pavlacka et al.  (45) Date of Patent: Jan. 17, 2006

(54) CABLE MANAGEMENT SYSTEM AND PROTECTIVE COVER FOR A REMOTE POWER SUPPLY

(75) Inventors: Myron F. Pavlacka, Frankfort, IL (US); Manuel Magana, Chicago, IL (US)

(73) Assignee: Federal Signal Corporation, University Park, IL (US)

( * ) Notice: Subject to any disclaimer, the term of this patent is extended or adjusted under 35 U.S.C. 154(b) by 505 days.

(21) Appl. No.: 10/280,192

(22) Filed: Oct. 25, 2002

(65) Prior Publication Data

US 2004/0080211 A1  Apr. 29, 2004

(51) Int. Cl.
 *H02B 1/20* (2006.01)
 *H02B 1/015* (2006.01)

(52) U.S. Cl. ............. 361/641; 361/622; 361/627
(58) Field of Classification Search ......... 361/622, 361/625, 627, 641
 See application file for complete search history.

(56) References Cited

U.S. PATENT DOCUMENTS

| 4,613,797 | A | | 9/1986 | Eggers et al. |
| 5,848,915 | A | * | 12/1998 | Canizales ............... 439/650 |
| 6,014,596 | A | | 1/2000 | Bess et al. |
| 6,100,791 | A | | 8/2000 | Bader et al. |
| 6,380,865 | B1 | | 4/2002 | Pederson |
| 6,424,269 | B1 | | 7/2002 | Pederson |
| 6,538,904 | B1 | * | 3/2003 | Isely et al. .............. 361/826 |
| 2002/0104577 | A1 | * | 8/2002 | McGroarty ............ 140/147 |
| 2003/0103304 | A1 | * | 6/2003 | Rendic .................... 361/90 |
| 2004/0160722 | A1 | * | 8/2004 | Miller, Jr. .............. 361/118 |

FOREIGN PATENT DOCUMENTS

| DE | 2834708 A | * | 2/1980 |
| DE | 3823057 A1 | * | 1/1990 |
| JP | 62082680 A | * | 4/1987 |

OTHER PUBLICATIONS

Federal Signal Corporation: Emergency Products—Strobe Systems product brochure (2001).

* cited by examiner

*Primary Examiner*—Anatoly Vortman
(74) *Attorney, Agent, or Firm*—Leydig, Voit & Mayer, Ltd

(57) ABSTRACT

The invention provides a power supply for a plurality of signaling devices on an emergency vehicle. The power supply includes a plurality of outlets distributed along a housing. A cable raceway extends through the housing past the plurality of outlets and defines a passage through which cables can be fed to connect each of the signaling devices to a respective one of the outlets. A cable comb is supported by the power supply housing and defines a plurality of cable slots in the cable raceway, with each slot being located adjacent a respective one of the outlets. Each outlet can have an associated light-emitting device (LED) for displaying an operational status of the signaling device connected to the respective outlet. A cover can be supported on the housing for movement between open and closed positions. The cover includes a plurality of light pipes arranged such that when the cover is in the closed position the cover encloses the outlets and LEDs and each light pipe is in optical registration with a respective one of the LEDs so as to provide a readily visible indication of the operational status of the individual signaling devices through the closed cover.

17 Claims, 11 Drawing Sheets

CABLE MANAGEMENT SYSTEM AND PROTECTIVE COVER FOR A REMOTE POWER SUPPLY

FIELD OF THE INVENTION

This invention pertains to remote power supplies, and more particularly to a remote power supply for emergency lights on a motor vehicle.

BACKGROUND OF THE INVENTION

Typically, signaling systems for emergency vehicles include a plurality of signaling devices such as a siren/speaker and visual indicators such as rotating and flashing lights and auxiliary lights such as take-down lights, alley lights and headlight flashers. Different combinations of these devices are simultaneously operated in order to create signaling patterns of different types. Each signaling pattern is usually designed for use in a particular category of emergency situation. For example, when a vehicle employing such a system is stopped on the side of the road to assist a disabled vehicle, operation of only the flashing lights might be appropriate. When pursuing a vehicle, maximum signaling is required and other visual indicators and a siren may be added to the flashing lights. A non-pursuit-type emergency may call for the visual indicators, but no siren.

One method by which the different signaling patterns or sequences can be produced is by connecting all of the different signaling devices into a common controller or power supply. For example, strobe lights are a common visual indicator used in emergency signaling systems. Strobe lights can be configured as stand-alone units, with each strobe light including the necessary electronics to display a particular flash sequence or pattern. Alternatively, multiple strobe lights can be connected to a central power supply or controller, which allows for programming of different flash sequences or patterns across the multiple strobe lights.

However, as each signaling device must be connected to the common power supply or controller via a respective cable, the cable management issues associated with such systems can make them more difficult and time consuming to install. Moreover, the common power supply or controller is often installed in the trunk of the emergency vehicle making it susceptible to being hit and damaged by objects shifting or objects carelessly placed in the trunk. This can lead to failure of one or more of the signaling devices if, for example, the respective cables become disengaged from the power supply or controller.

BRIEF SUMMARY OF THE INVENTION

The invention provides a power supply for a plurality of signaling devices on an emergency vehicle. The power supply includes a plurality of outlets distributed along a housing. In one embodiment, a cable raceway extends through the housing past the plurality of outlets and defines a passage through which cables can be fed to connect each of the signaling devices to a respective one of the outlets. A cable comb is supported by the power supply housing and defines a plurality of cable slots in the cable raceway, with each slot being located adjacent a respective one of the outlets.

In another embodiment, each outlet has an associated light-emitting device (LED) for displaying an operational status of the signaling device connected to the respective outlet. Additionally, a cover can be supported on the housing for movement between open and closed positions. The cover includes a plurality of light pipes arranged such that when the cover is in the closed position the cover encloses the outlets and LEDs and each light pipe is in optical registration with a respective one of the LEDs so as to provide a readily visible indication of the operational status of the individual signaling devices through the closed cover.

DETAILED DESCRIPTION OF THE INVENTION

Figure 1:
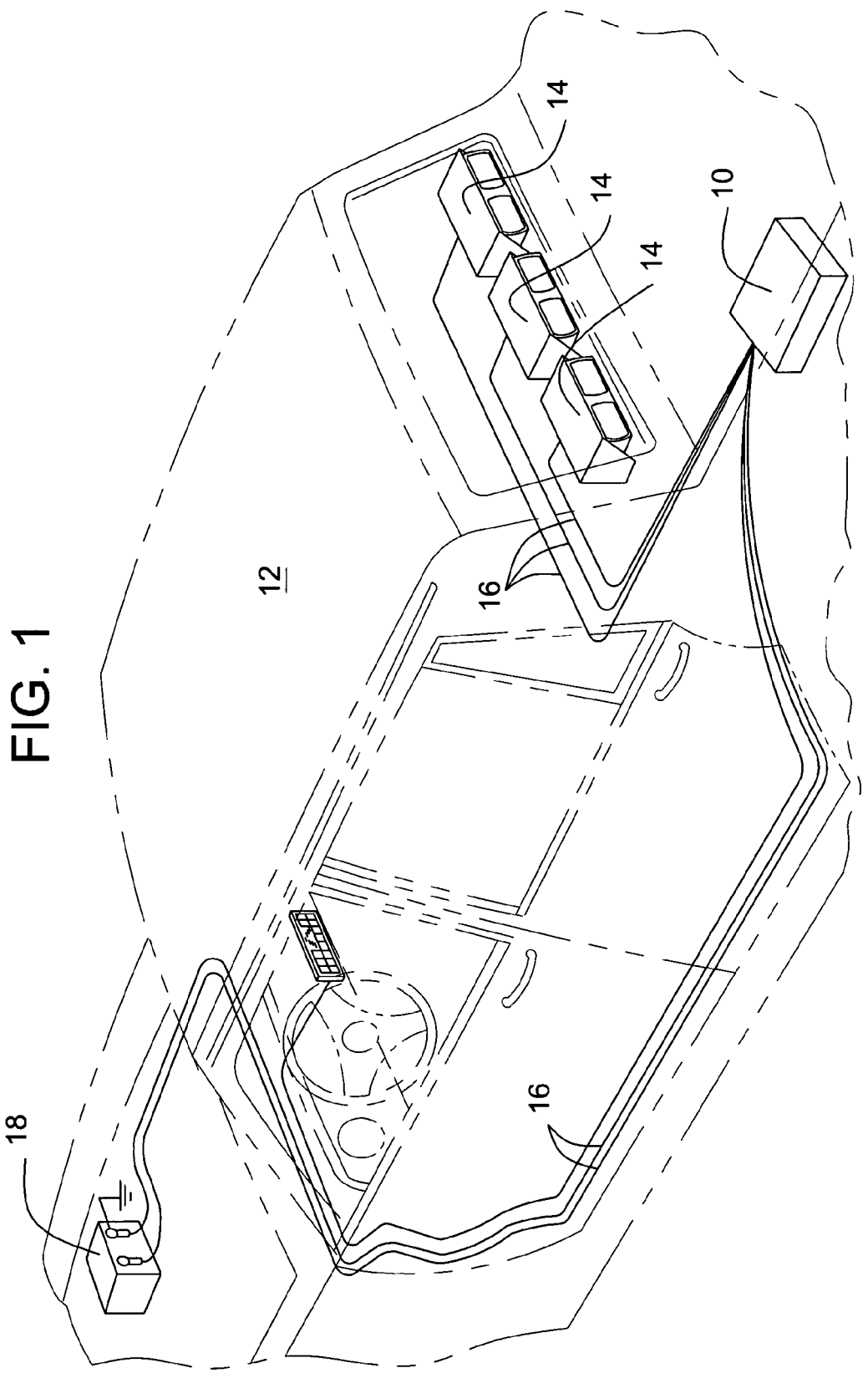
FIG. 1 is a perspective view of an emergency vehicle equipped with an exemplary signaling system having a power supply in accordance with the present invention.

Referring now more particularly to FIG. 1 of the drawings, an illustrative signaling system having a power supply 10 in accordance with the present invention is shown installed in an emergency vehicle 12 (in broken lines). The illustrated signaling system includes a plurality of signaling devices 14, in this case strobe lights, which are mounted to the vehicle 12. In the illustrated embodiment, each of the strobe lights 14 is connected via a respective cable 16 to a common power supply 10. Although the power supply 10 is shown mounted in the trunk of the vehicle 12, it may be mounted elsewhere such as for example under the dashboard in the passenger compartment of the vehicle. The power supply 10 is, in turn, connected to the vehicle battery 18. The power supply 10 conditions power from the vehicle battery 18 in order to produce light flashes in the individual strobe lights 14. Additionally, the power supply 10 also controls the power distribution to the individual strobe lights 14 in the signaling system so as to allow for the production of different flash patterns across the plurality of strobe lights 14.

While the present invention is described in connection with strobe lights, it will be appreciated that the invention is equally applicable to any type of signaling device that may be used on an emergency vehicle, including for example other types of flashing lights, rotating lights, sirens and auxiliary lights. Moreover, while the present invention is described in connection with a strobe power supply that performs both power conditioning and flash pattern generation, the teachings of the present invention are also applicable to other components to which a plurality of signaling devices may be electrically connected, including for example strobe power supplies that perform only power conditioning and strobe controllers for generating flash patterns as well as power supplies and controllers for other types and combinations of signaling devices. Thus, as used herein the term "power supply" shall mean a power supply, controller, control unit or any other component to which a plurality of signaling devices may be electrically connected.

Figure 2:
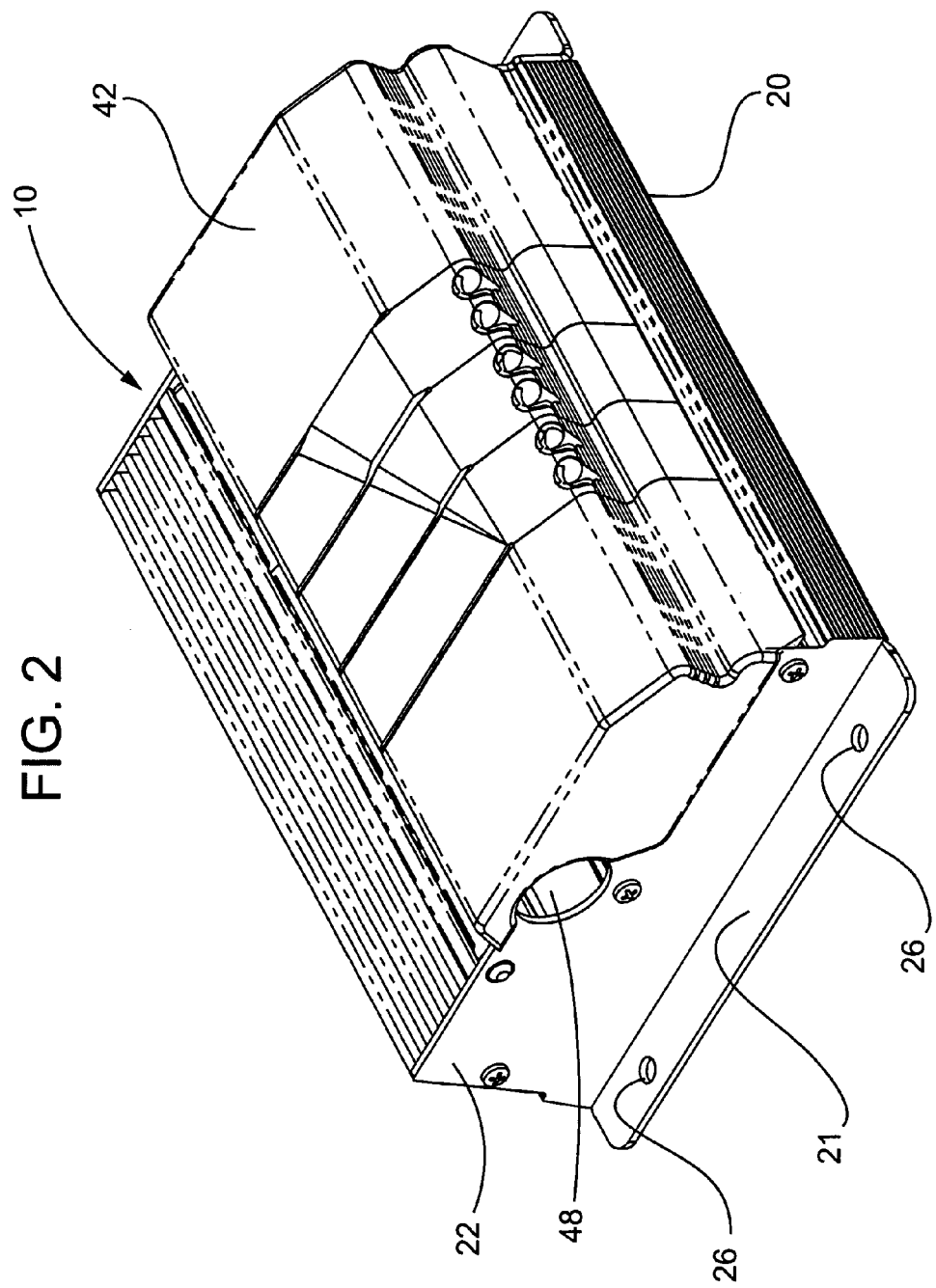
FIG. 2 is a perspective view of an illustrative power supply in accordance with the present invention.
Figure 3:
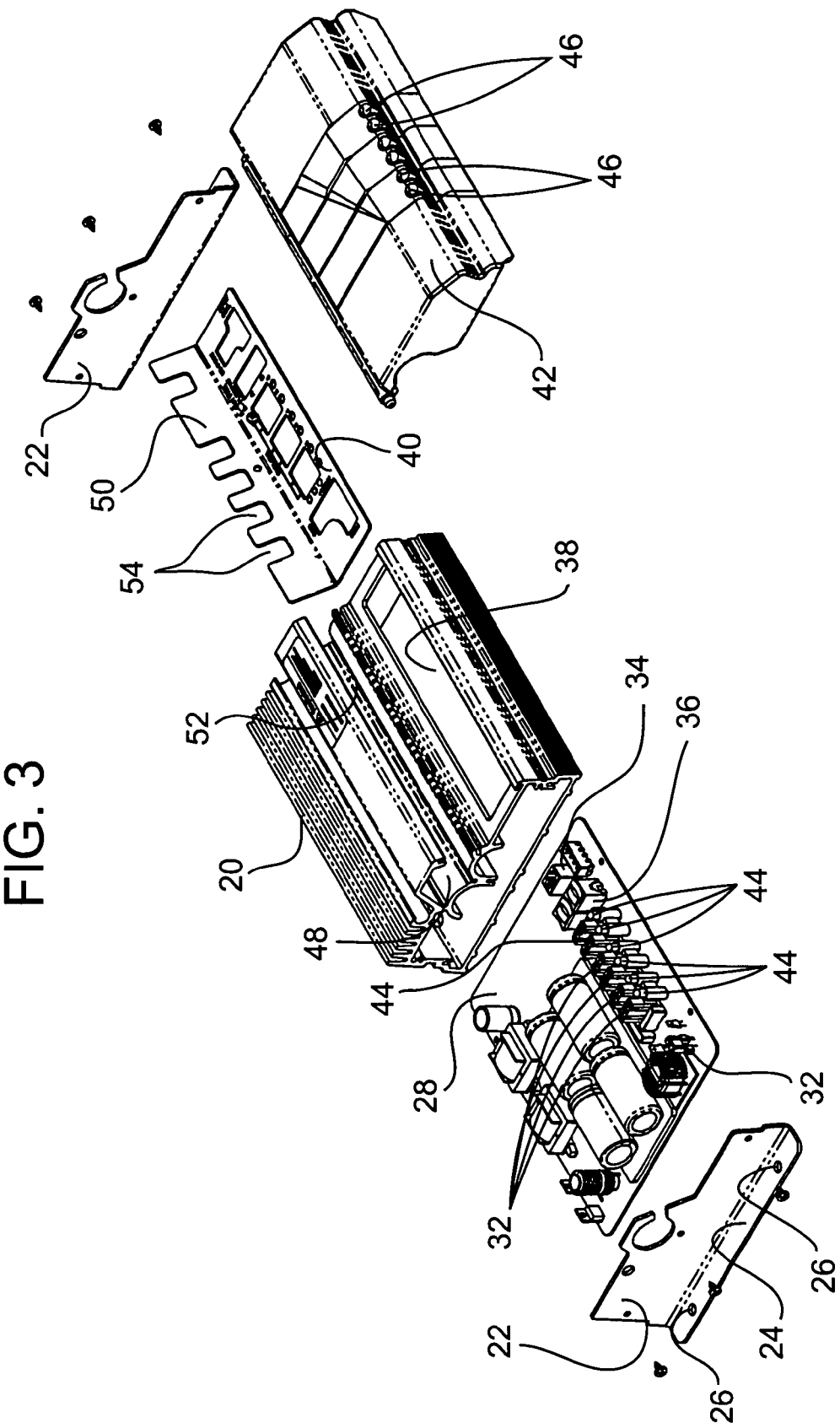
FIG. 3 is an exploded top perspective view of the power supply of FIG. 2.
Figure 4:
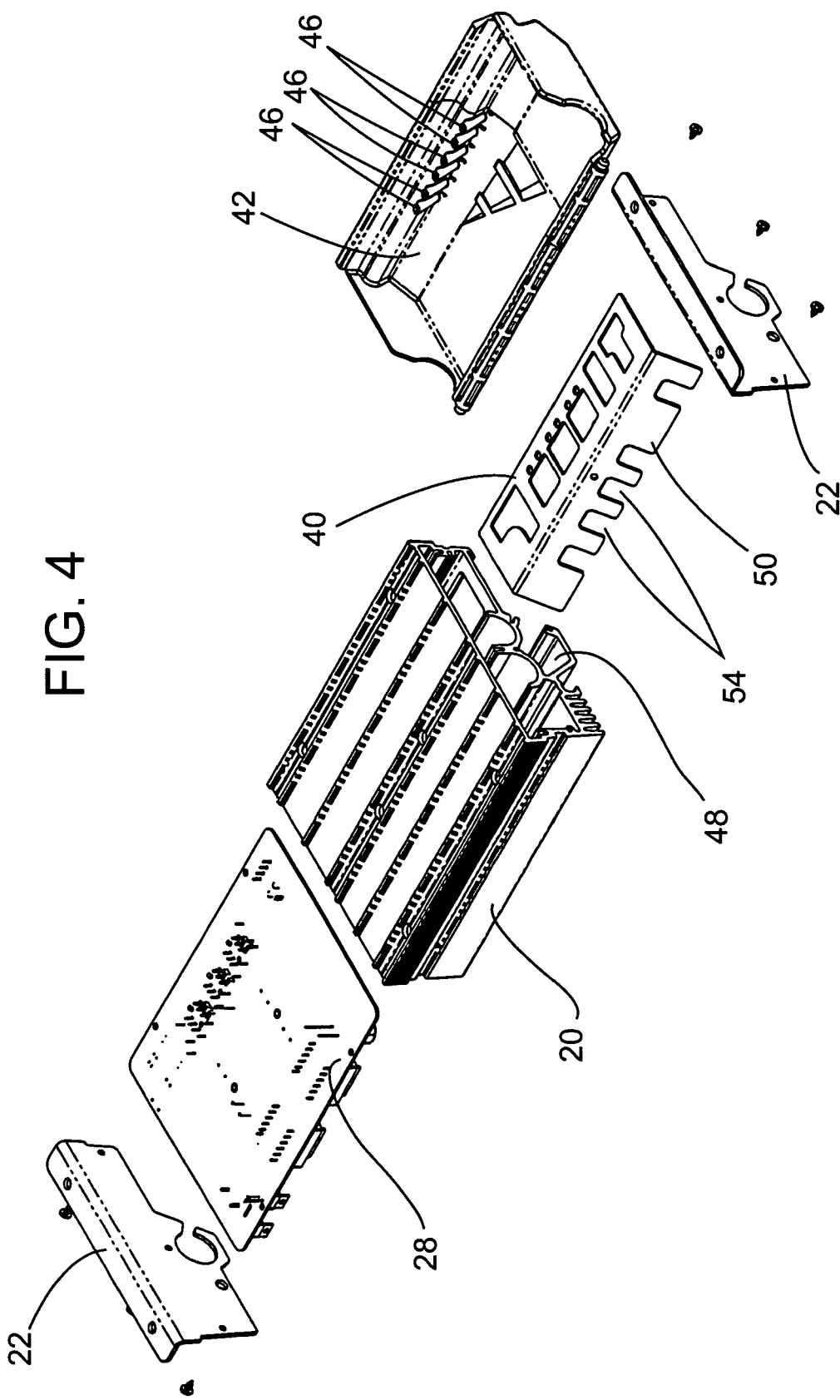
FIG. 4 is an exploded bottom perspective view of the power supply of FIG. 2.

In the illustrated embodiment, the power supply 10 includes a housing 20 that is closed at each end by an end wall 22 as shown in FIGS. 2–4. To facilitate mounting of the power supply 10 to a vehicle, an outwardly extending mounting flange 24 is provided at the lower end of each of the end walls 22. Each of the mounting flanges 24 includes holes 26 for receiving mounting screws that can secure the power supply 10 to a surface. It will be appreciated that the present invention is not limited to any particular mounting arrangement.

As best shown in FIGS. 3 and 4, a printed circuit board 28 is arranged within the housing 20. In this case, the printed circuit board 28 includes the electronics that condition the power supplied by the vehicle battery and generate the flash patterns. Specific details concerning these electronics are disclosed in commonly assigned application Ser. No. 10/281,077 entitled "Flash Strobe Power Supply System and Method" with inventors Larry Block and Joe Allison, the disclosure of which is incorporated herein by reference in its entirety.

Figure 6:
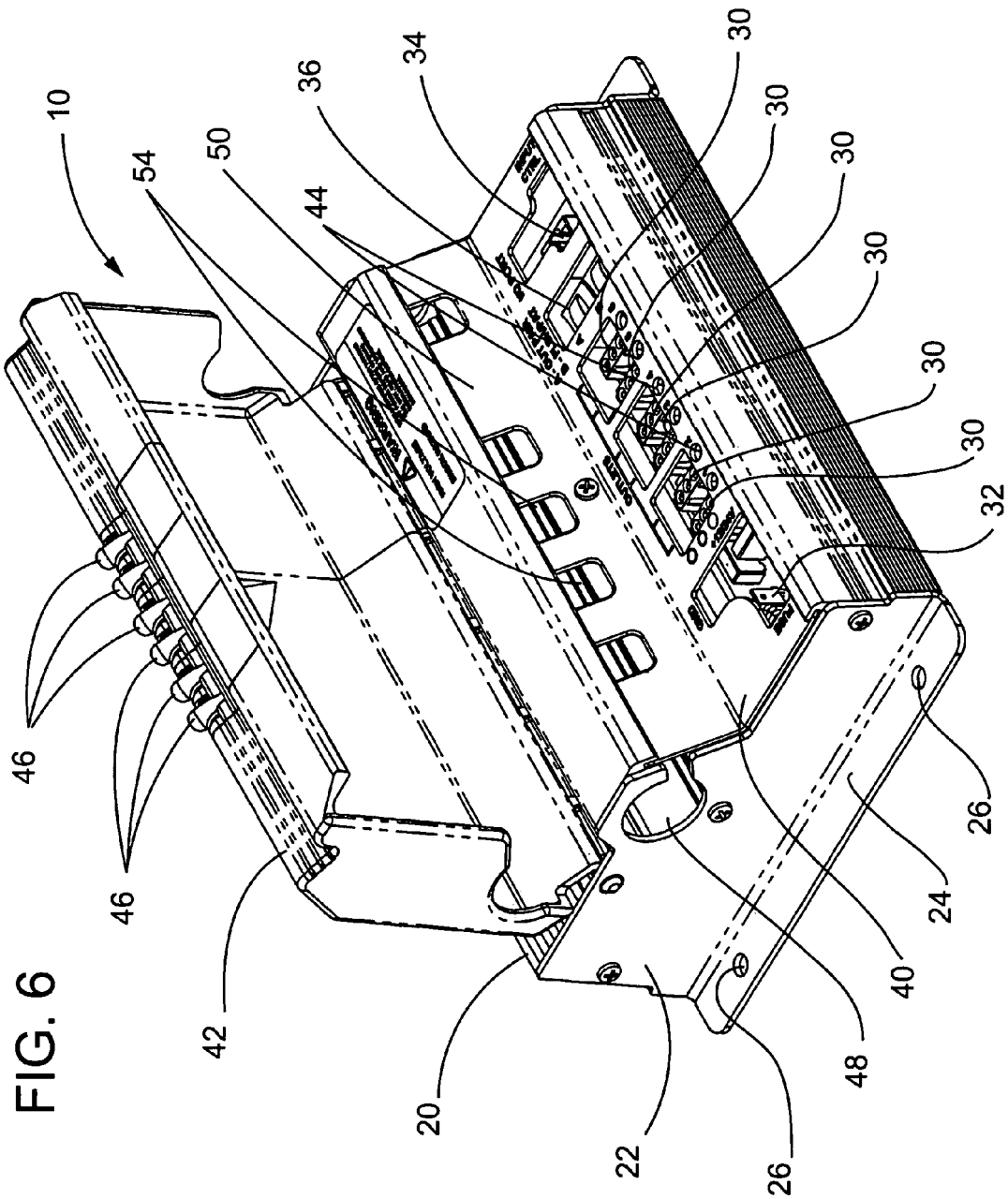
FIG. 6 is a top perspective view of the power supply of FIG. 2 with the cover in an open position.

For distributing power to the individual strobe lights 14, a plurality of signaling device outlets 30 are distributed on the circuit board 28. As described in greater detail below, each of the strobe lights 14 can be connected to a corresponding one of the outlets 30 by a respective cable 16. In the illustrated embodiment, the signaling device outlets 30 are arranged in an array comprising a single a row that extends in the longitudinal direction of the circuit board 28. The illustrated circuit board 28 further includes a power outlet 32 for connecting the power supply 10 to a power source, e.g. the automotive battery, and an input control outlet 34. The input control outlet 34 can be used to connect the power supply to an input device, for example in the passenger compartment of the vehicle, that allows the emergency vehicle operator to select a particular signaling mode. Additionally, the illustrated circuit board 28 supports a pair of push buttons 36, which can be used to program the power supply 10 to produce different flash patterns. As shown in FIGS. 3 and 6, the power and input control outlets 32, 34 and the programming buttons 36 are arranged at the ends of the row of signaling device outlets 30 on the circuit board 28.

To permit access to the outlets 30, 32, 34 as well as the programming buttons 36, a window 38 is provided in the upper surface of the housing 20 as shown in FIG. 2. Optionally, a faceplate 40 having a plurality of openings therein can be arranged over the window 38 to assist in the identification of the various outlets and controls of the power supply. In particular, as shown in FIGS. 3 and 6, the faceplate 40 can include insignia that identify the power and input control outlets 32, 34, the various signaling device outlets 30 as well as the other controls that may be provided on the circuit board 28.

Figure 5:
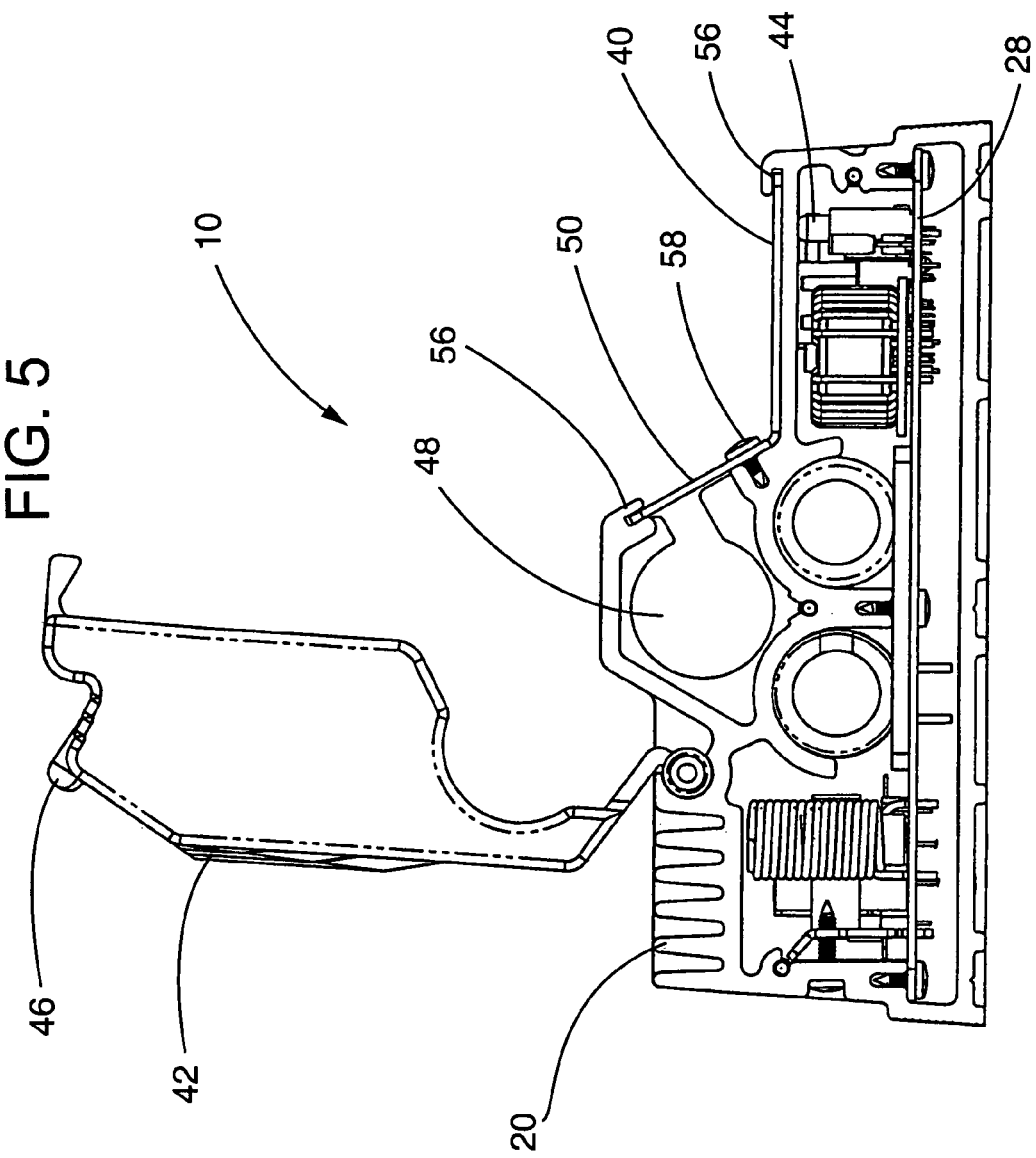
FIG. 5 is a side view of the power supply of FIG. 2 showing the cover in an open position

To enclose and protect the various cable connections, the power supply 10 can include a cover 42. In the illustrated embodiment, the cover 42 is pivotally supported on the housing 20 for movement between open and closed positions. In the open position, the cover 42 is pivoted upward relative to the housing 20 as shown in FIGS. 5 and 6 to permit access to the outlets 30, 32, 34 and other controls of the power supply 10 through the window 38 and the openings in the faceplate 40. In the closed position (see, e.g., FIG. 2), the cover 42 overlies the window 38 and faceplate 40 so as protect the connections to the outlets 30, 32, 34 of the power supply 10 from damage. In particular, common power supplies and controllers for vehicle signaling systems are frequently installed in locations such as the trunk where they are susceptible to being hit by other objects. The cover 42 shields the connections between the various cables 16 and the outlets 30, 32, 34 of the power supply 10 thereby reducing the risk that an object hitting the power supply will dislodge one or more of the cables causing a failure of one of the signaling devices.

For providing an indication of the operational status of the signaling device 14 connected to the respective outlet 30, each signaling device outlet 30 has an associated light-emitting device or diode (LED) 44 (see, e.g., FIG. 3) that is adapted to illuminate upon actuation of its associated signaling device 14. Accordingly, in the case of the illustrated embodiment, the LED 44 associated with a particular outlet 30 will flash each time the strobe light 14 connected to the outlet is flashed. The LEDs 44 thereby provide a simulation of the flash pattern being produced by the power supply 10 including identifying what strobe lights 14 are being illuminated as well as the flash rate. In this instance, each LED 44 is supported on the circuit board 28 adjacent its respective outlet 30 as shown in FIG. 3. Since the LEDs 44 provide a visual indication of the operational status of the signaling devices 14 at the power supply 10 itself, problems in the signaling system can be diagnosed more quickly and easily. It will be appreciated that more than one LED can be associated with each outlet. Thus, as used herein LED is meant to include both its singular and plural sense.

To provide visibility of the LEDs 44 when the cover 42 is closed, a plurality of light pipes 46 are arranged in the cover as best shown in FIGS. 2, 4 and 6. In particular, the light pipes 46 extend between lower and upper surfaces of the cover and are arranged such that when the cover 42 is in the closed position each light pipe 46 is in optical registration with a respective one of the LEDs 44. The light pipes 46 are adapted to magnify the light produced by the illuminated LEDs 44 so that the LEDs 44 are readily visible through the light pipes when the cover 42 is closed.

To permit quicker and easier installation, the power supply 10 can include a unique cable management system. The cable management system not only eases the installation process it also ensures that the cables 16 connected to the power supply are organized in a more orderly fashion thereby improving the appearance of the power supply 10. Additionally, the cable management system provides strain relief so that a cable will not become disengaged from the power supply 10 if it is accidentally snagged or tugged. In the illustrated embodiment, the cable management system of the power supply includes a cable raceway 48 and a cable comb 50. As shown in FIGS. 3 and 5, the cable raceway 48 consists of a passage that extends through the housing 20 so as to define a pathway through which the cables 16 can be fed as a neat bundle to the outlets 30, 32, 34. To this end, the raceway passage extends past the window 38 in the housing and the outlets 30, 32, 34 on the circuit board 28 that are accessible through the window (see, e.g., FIGS. 3 and 6). Moreover, the raceway 48 has a longitudinally extending opening 52 in a side thereof which extends adjacent the window 38. In this instance, the raceway 48 extends between the two end walls 22 of the housing 20 and is open at both ends so that cables 16 can be fed from either end of the power supply 10. As will be appreciated, this provides additional flexibility that can facilitate the installation process.

Figure 7:
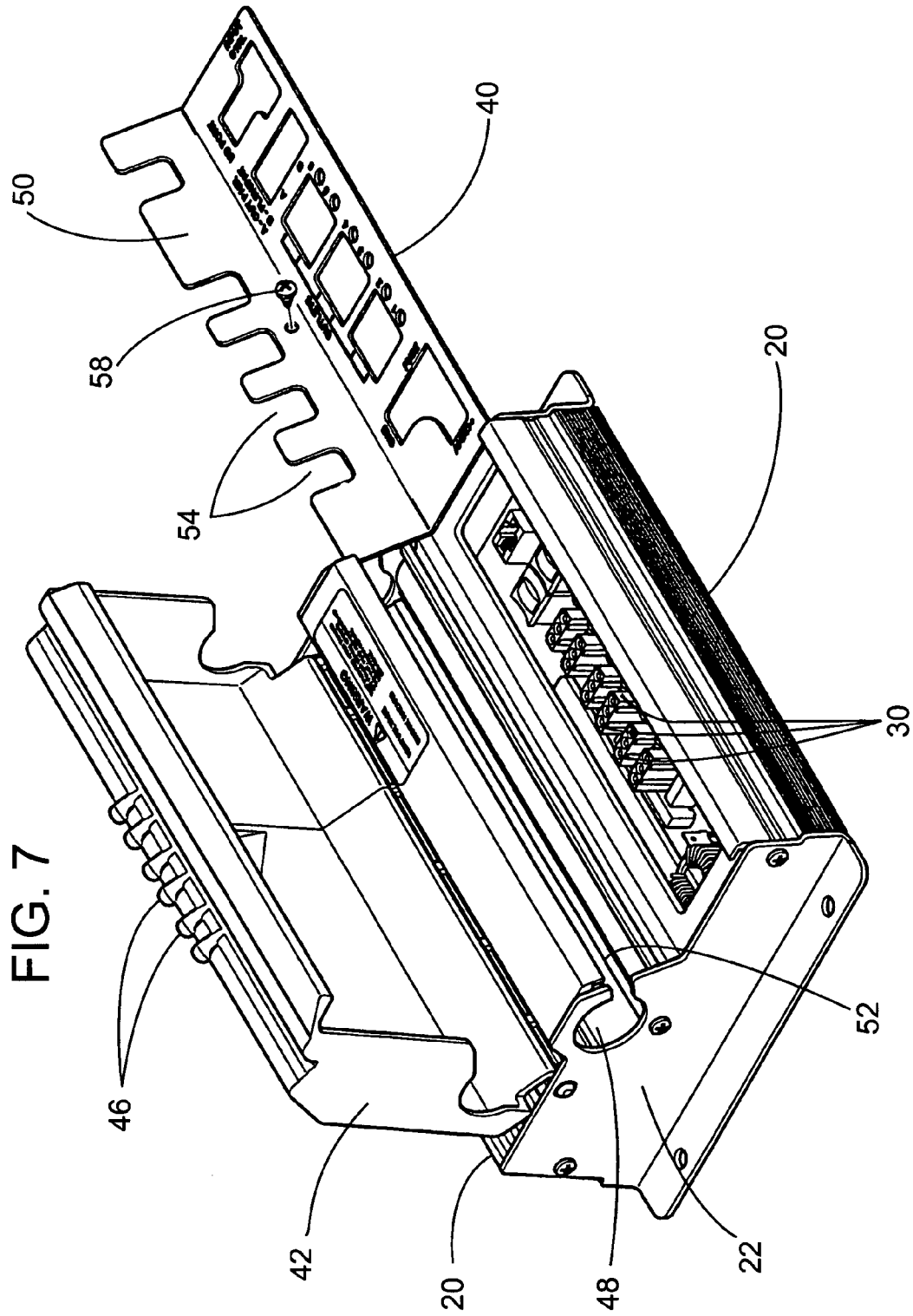
FIG. 7 is a top perspective view of the power supply of FIG. 2 with the cover in the open position and the faceplate and cable comb in a withdrawn position relative to the power supply housing.
Figure 8:
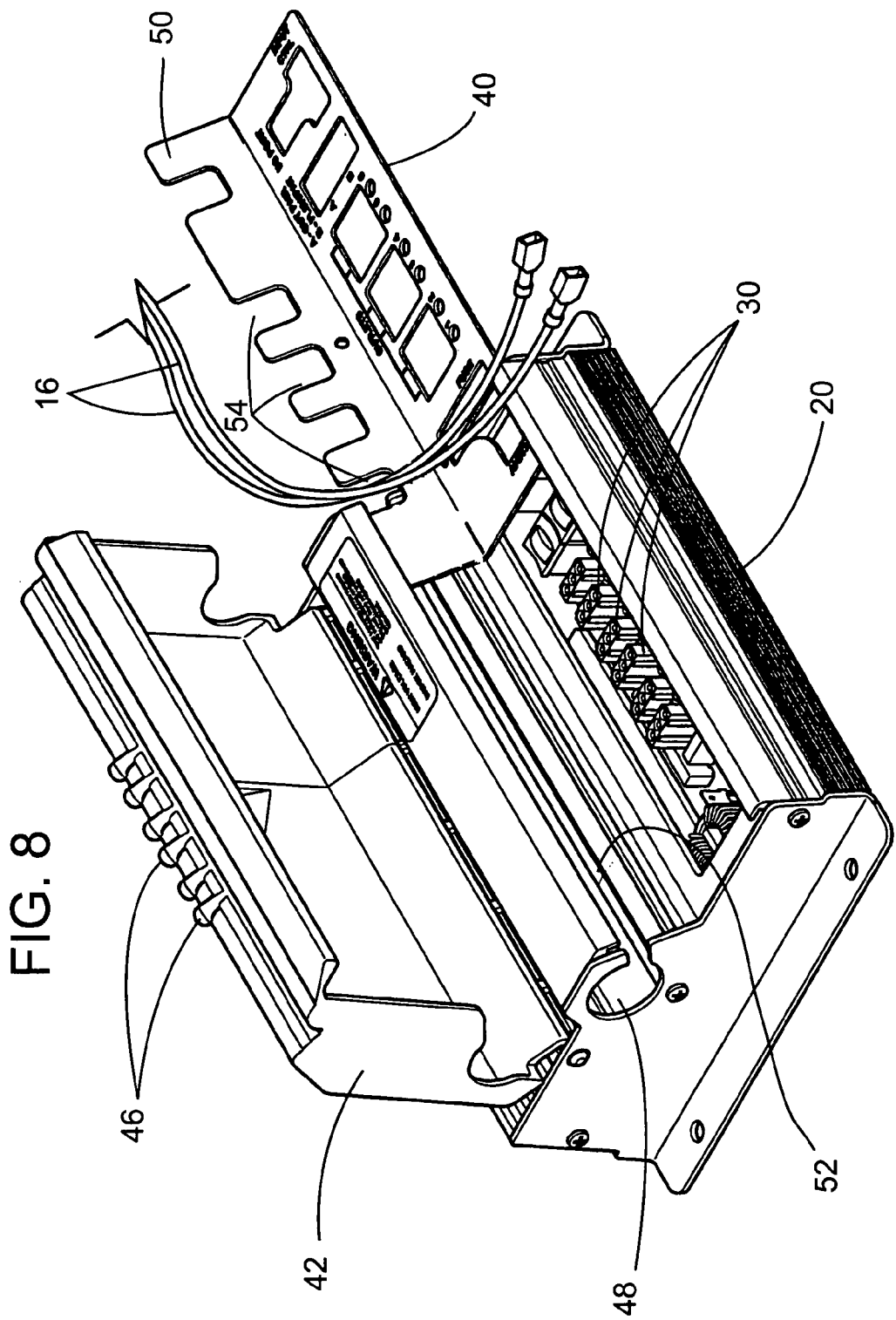
FIG. 8 is a top perspective view of the power supply of FIG. 2 with the cover in the open position and the faceplate and cable comb withdrawn from the housing and showing a cable inserted in the cable comb.
Figure 9:
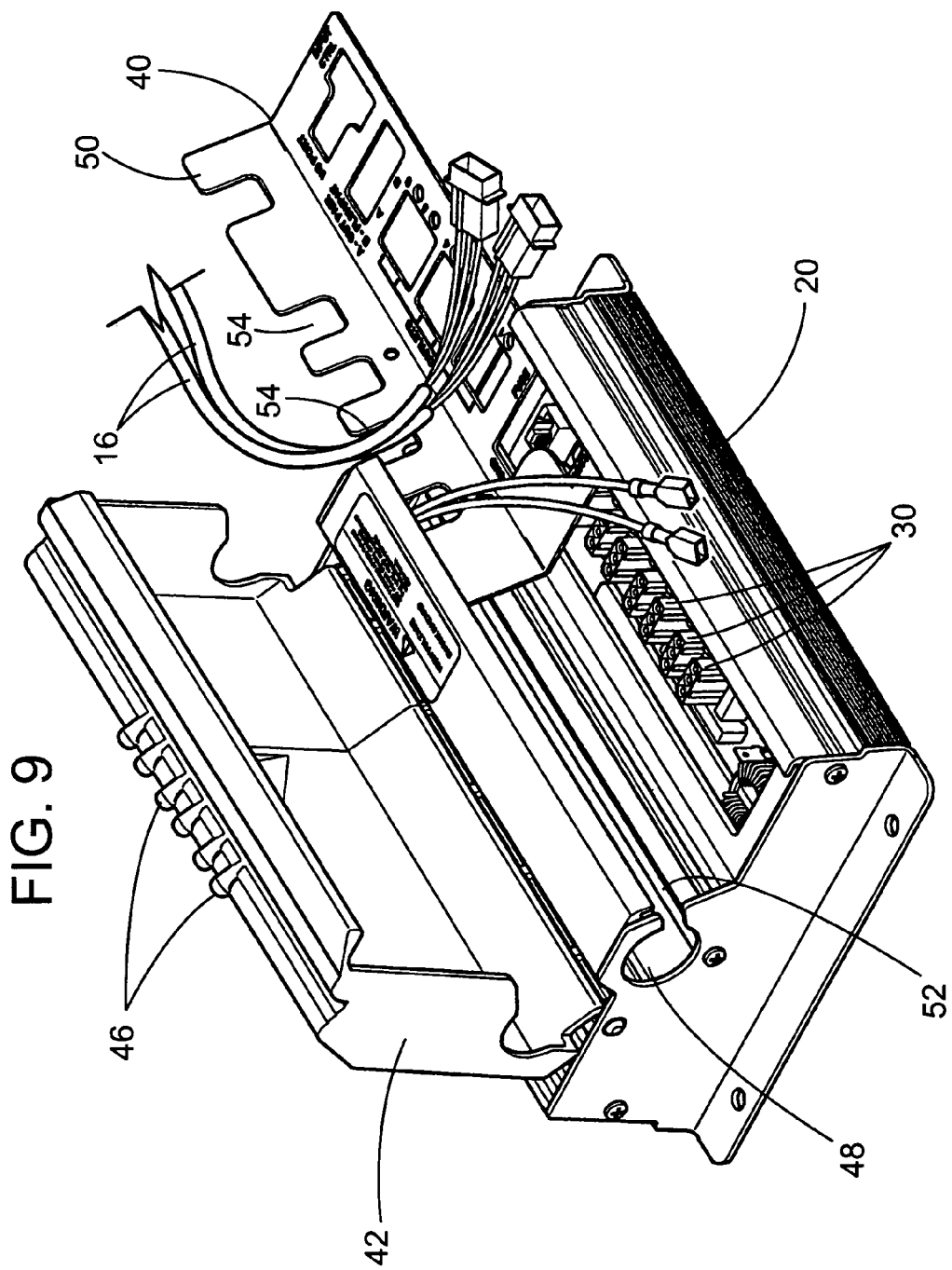
FIG. 9 is a top perspective view of the power supply of FIG. 2 with the cover in the open position and the faceplate and cable comb withdrawn from the housing and showing a plurality of cables inserted in the cable comb.

To simplify routing of the cables 16 from the raceway 48 to the outlets 30, 32, 34, the cable comb 50 divides the side opening 52 in the raceway 48 into a plurality of discrete slots 54 (see, e.g. FIG. 6). In the illustrated embodiment, the cable comb 50, which in this case is attached to the faceplate 40, is supported such that it can be withdrawn from the housing 20 into an extended position in order to facilitate insertion of the ends of the cables 16 into the slots 54 in the cable comb 50. Specifically, the cable comb 50 can be withdrawn from the housing 20 into a position where one or more of the slots 54 are outboard of the cable raceway 48 so as to able to receive a cable 16 as shown in FIGS. 7–9. In the illustrated embodiment, the cable comb 50, and attached faceplate 40, are received in a pair of grooves 56 in the housing 20 (see FIG. 5) such that the cable comb 50 and faceplate 40 can slide in and out relative to the housing 20. As shown in FIG. 6, when fully retracted into the housing, the cable comb 50 is arranged in overlying relation to the side opening 52 in the raceway 48 with each slot 54 being located adjacent a respective one of the outlets 30, 32, 34. From this position, the cable ends protruding from each slot can be easily connected to the nearest outlet (see FIGS. 10 and 11).

To connect the various cables or wires to the power supply, the cable comb 50 is first slid out of the housing 20 towards the end of the raceway 48 through which the cables 16 will enter (see FIG. 7). If cables will be fed into both ends of the raceway 48, it is preferable to first slide the cable comb 50 toward the end of the raceway 48 through which the lesser amount of cables will enter. Then, after the cables 16 are inserted in that end of the raceway 48, the same process can be repeated at the other end of the raceway. Once the cable comb 50 is retracted from the housing 20, the appropriate cable or cables 16 are inserted in the slot 54 closest to the housing 20 with the end of the cables extending out of the slot towards the window 38 in the housing as shown in FIG. 8. After the cables 16 are properly positioned in the slot 54, the cable comb 50 then can be slid inward a sufficient distance so that the slot 54 is arranged over the raceway 48, capturing the cable or cables as shown in FIG. 9. The process is then repeated with the next slot 54, i.e. the appropriate cables are inserted in the slot that is now closest to the housing (see FIG. 9).

Figure 10:
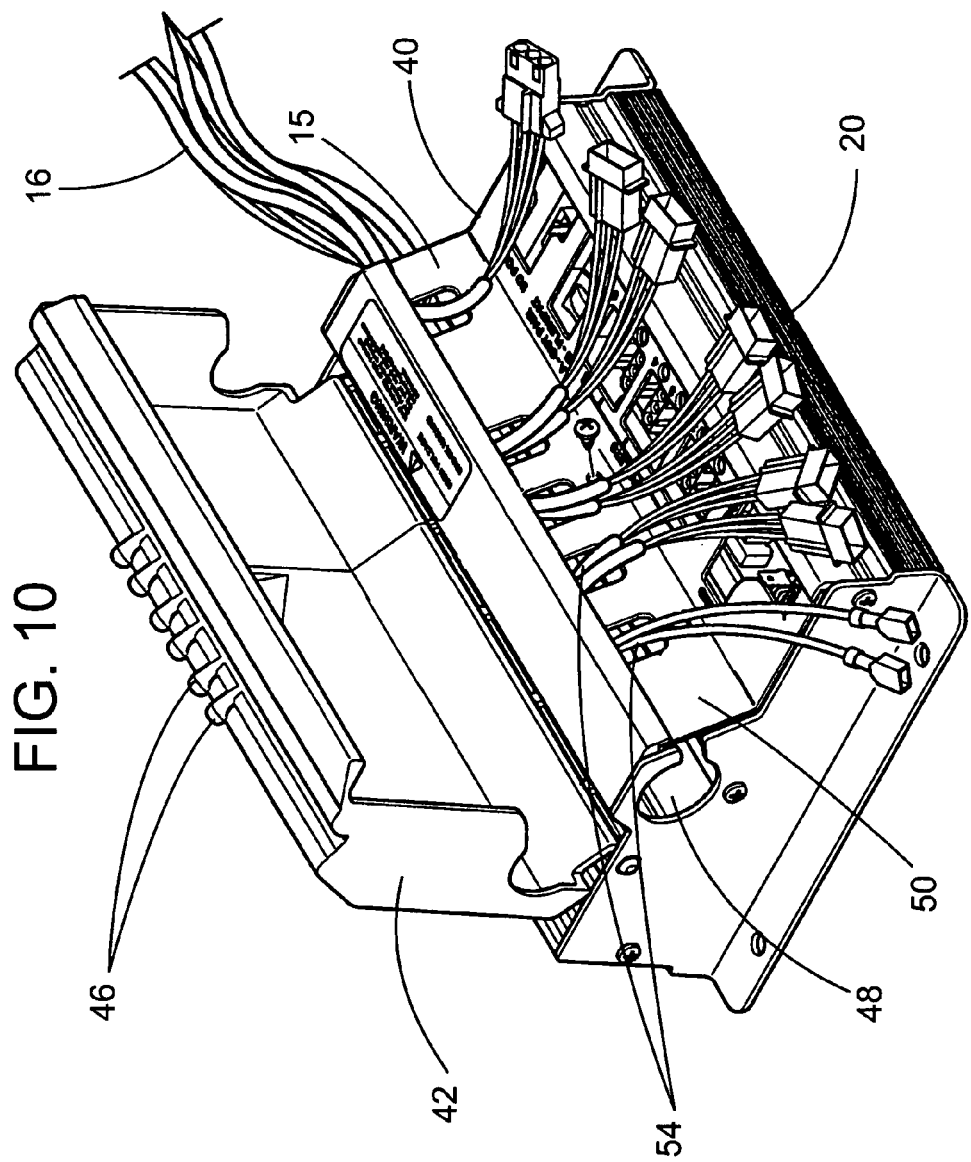
FIG. 10 is a top perspective view of the power supply of FIG. 2 with the cover in the open position and the faceplate and cable comb retracted into the housing and showing a plurality of cables inserted in the cable comb.
Figure 11:
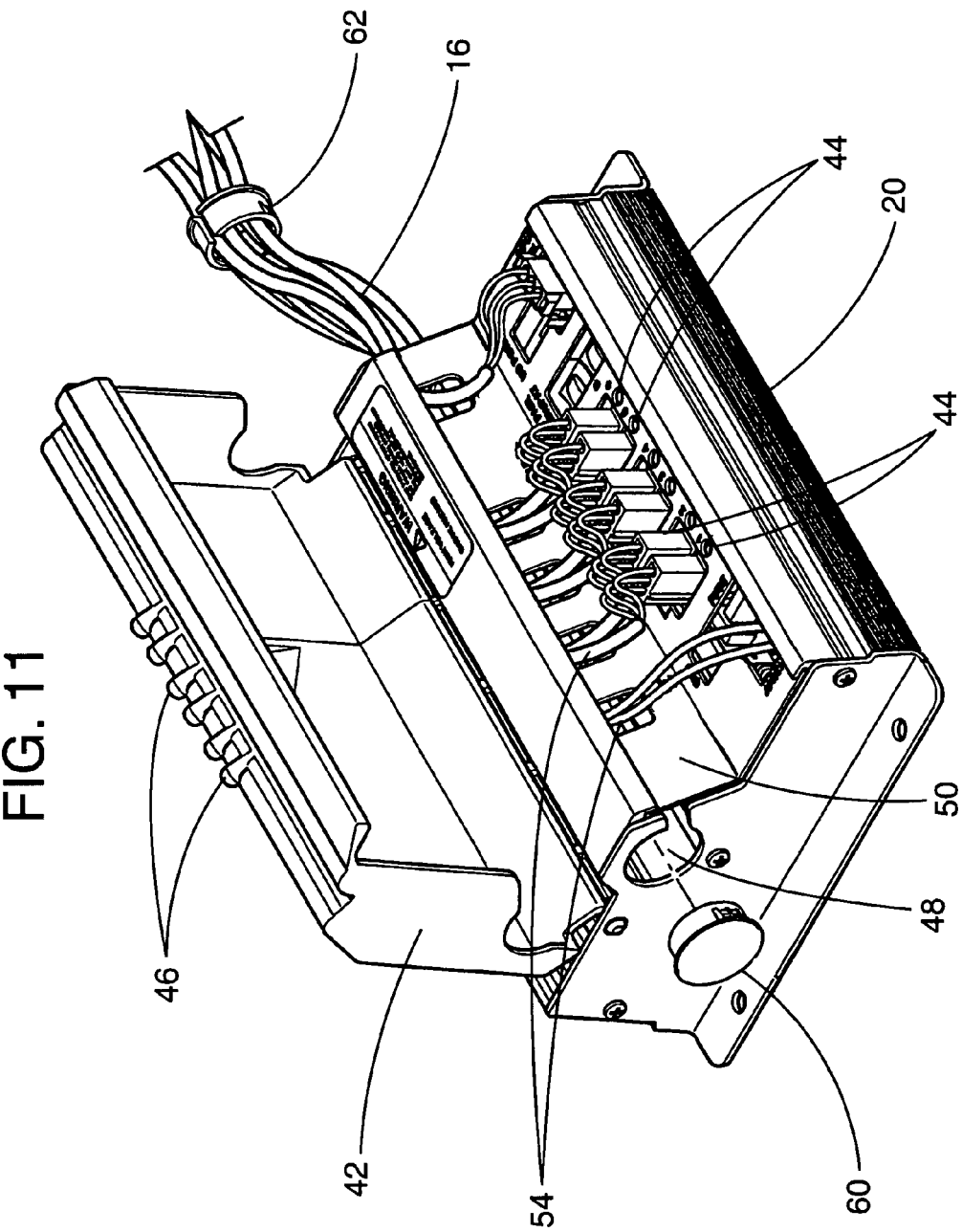
FIG. 11 is a top perspective view of the power supply of FIG. 2 with the cover in the open position and the faceplate and cable comb retracted into the housing and showing a plurality of cables plugged into corresponding outlets in the power supply.

Once all of the cables 16 have been inserted in the appropriate slots 54, the cable comb 50 is slid completely into the housing 20 (as shown in FIG. 10) where it, and the faceplate 40, can be secured in place via a set screw 58. As shown in FIG. 11, the individual cables 16 can then be connected to the appropriate outlets 30, 32, 34 in the power supply 10 and any additional slack in the cables 16 can be worked into the cable raceway 48 and out of the housing 20. A plug 60 can then be installed in the raceway 48 end opening (if any) that does not have cables extending there-through and a bushing 62 can be installed in the end of the raceway 48 through which the cables 16 exit. While this process simplifies installation of the power supply, it will be understood that variations on the process as well as different processes may be employed depending upon the specific implementation of the power supply.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power supply for connecting to a plurality of signaling devices on an emergency vehicle, comprising:
   a plurality of outlets distributed along a housing;
   a cable raceway extending through the housing past the plurality of outlets and through which cables can be fed to connect each of the signaling devices to a respective one of the outlets; and
   a cable comb received in the power supply housing and defining a plurality of cable slots in the cable raceway, wherein each of the plurality of slots is located adjacent a respective one of the outlets.

2. The power supply according to claim 1 further including a power outlet supported on the housing for connecting the power supply to a power source and wherein at least one slot of the plurality of slots defined in the cable raceway by the cable comb is located adjacent the power outlet.

3. The power supply according to claim 1 further including an input control outlet for connecting the power supply to an input device and wherein at least one of the plurality of slots defined in the cable raceway by the cable comb is located adjacent the input control outlet.

4. The power supply according to claim 1 wherein the plurality of outlets are supported on a printed circuit board in the housing.

5. The power supply according to claim 1 wherein the plurality of outlets are arranged in a single row.

6. The power supply according to claim 1 further including a cover supported on the housing for movement between open and closed positions wherein when the cover shields the outlets.

7. The power supply according to claim 1 wherein each outlet has an associated light emitting device which displays an operational status of the signaling device connected to the respective outlet.

8. The power supply according to claim 7 further including a cover that is movable between an open position and a closed position wherein the cover overlies the outlets, the cover having a plurality of light pipes arranged such that when the cover is in the closed position each light pipe is in optical registration with a respective one of the LEDs.

9. The power supply according to claim 1 wherein the plurality of outlets are accessible through a window in the housing.

10. The power supply according to claim 9 wherein the raceway includes an opening that extends adjacent the window in the housing.

11. The power supply according to claim 10 wherein the cable comb overlies the opening in the cable raceway.

12. The power supply according to claim 1 wherein the raceway includes openings at opposing ends of the power supply.

13. The power supply according to claim 1 wherein the cable comb is movable relative to the housing into a position wherein at least one of the slots in the cable comb is arranged outside of the housing.

14. A power supply for connecting to a plurality of signaling devices on an emergency vehicle, comprising:
   a plurality of outlets distributed along a housing to which the signaling devices can be connected, each outlet having an associated light emitting device (LED) for displaying an operational status of the signaling device connected to the respective outlet; and
   a cover supported on the housing for movement between open and closed positions, the cover having a plurality of light pipes arranged such that when the cover is in the closed position the cover overlies the outlets and LEDs and each light pipe is in optical registration with a respective one of the LEDs so as to provide a readily visible indication of the operational status of the individual signaling devices through the closed cover.

15. The power supply according to claim 14 wherein the plurality of outlets are supported on a printed circuit board in the housing.

16. The power supply according to claim 14 further including a raceway extending through the housing past the plurality of outlets and through which cables can be fed to connect each of the signaling devices to a respective one of the outlets.

17. A method for connecting a plurality signaling devices on an emergency vehicle to a power supply, the power supply having a plurality of outlets distributed along a housing, the method comprising the steps of:
   inserting a connection end of a cable associated with each signaling device into a respective slot in a cable comb which is arranged such that the slots are outside of a housing of the power supply;
   moving the cable comb into overlying relation to a cable raceway that extends through the power supply housing so as to draw the cables into the cable raceway;
   moving the cable comb into a final position wherein each slot in the cable comb defines a cable raceway slot adjacent a respective one of the outlets in the power supply; and
   connecting the connection end of each power cable to the adjacent outlet.

* * * * *